(12) United States Patent  
Park

(10) Patent No.: US 8,675,154 B2
(45) Date of Patent: Mar. 18, 2014

(54) LIQUID CRYSTAL DISPLAY DEVICE

(75) Inventor: Won Sang Park, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 270 days.

(21) Appl. No.: 12/926,787

(22) Filed: Dec. 9, 2010

(65) Prior Publication Data

US 2011/0261296 A1  Oct. 27, 2011

(30) Foreign Application Priority Data

Apr. 23, 2010 (KR) .................. 10-2010-0037851

(51) Int. Cl.
*G02F 1/1335* (2006.01)

(52) U.S. Cl.
USPC ............... 349/96; 349/181; 349/12; 349/98; 345/173; 345/174

(58) Field of Classification Search
USPC .................. 349/96, 181, 12, 98; 345/173
See application file for complete search history.

(56) References Cited

U.S. PATENT DOCUMENTS

| | | | | |
|---|---|---|---|---|
| 6,392,727 B1 * | 5/2002 | Larson et al. | .................. | 349/96 |
| 2005/0053790 A1 * | 3/2005 | Kato | ............................ | 428/421 |
| 2006/0028601 A1 * | 2/2006 | Kawahara et al. | ............ | 349/117 |
| 2006/0146207 A1 * | 7/2006 | Cho et al. | ........................ | 349/12 |
| 2008/0231605 A1 * | 9/2008 | Yang | ............................. | 345/173 |
| 2008/0246904 A1 * | 10/2008 | Cho et al. | ......................... | 349/96 |
| 2009/0002580 A1 * | 1/2009 | Matsushima et al. | ........... | 349/12 |
| 2009/0180068 A1 * | 7/2009 | Kikuchi et al. | ................ | 349/117 |
| 2010/0026936 A1 * | 2/2010 | Uesaka et al. | .................. | 349/75 |

FOREIGN PATENT DOCUMENTS

| | | |
|---|---|---|
| JP | 2000-039611 A | 2/2000 |
| KR | 10 2000-0066059 A | 11/2000 |
| KR | 10 2004-0097510 A | 11/2004 |
| KR | 10 2005-0009838 A | 1/2005 |
| WO | WO 00/41030 A1 | 7/2000 |

OTHER PUBLICATIONS

European Search Report in EP 11163321.0-2205, dated Aug. 23, 2011 (PARK).
Korean Office Action in KR 10-2010-0037851, dated Jan. 31, 2012 (PARK).

* cited by examiner

*Primary Examiner* — Edward Glick
*Assistant Examiner* — Sang V Nguyen
(74) *Attorney, Agent, or Firm* — Lee & Morse, P.C.

(57) ABSTRACT

A liquid crystal display device includes a liquid crystal display panel, a first polarizer between the liquid crystal display panel and a back light behind the liquid crystal display panel, the first polarizer including a first polarization film having a first transmission axis and a first phase-difference film having a first polarization axis, a second polarizer in front of the liquid crystal display panel, the second polarizer including a second polarization film having a second transmission axis intersecting the first transmission axis, a second phase-difference film having a second polarization axis intersecting the first polarization axis, and a third phase-difference film having a third polarization axis, and a substrate structure above the liquid crystal display panel and the second polarizer, the substrate structure includes a third polarizer in the substrate structure, the third polarizer including a fourth phase-difference film having a fourth polarization axis intersecting the third polarization axis.

19 Claims, 5 Drawing Sheets

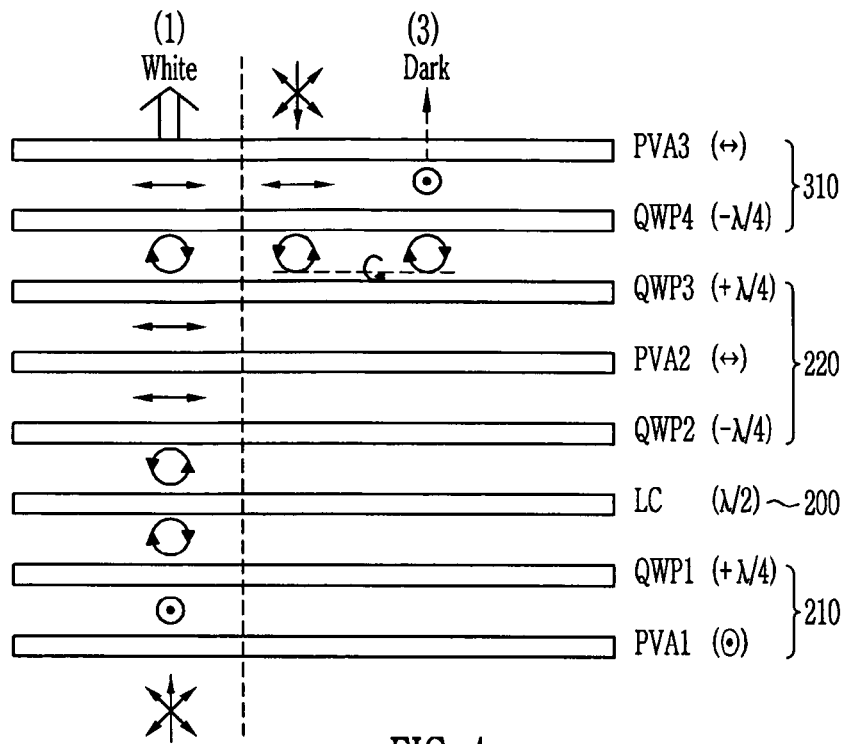
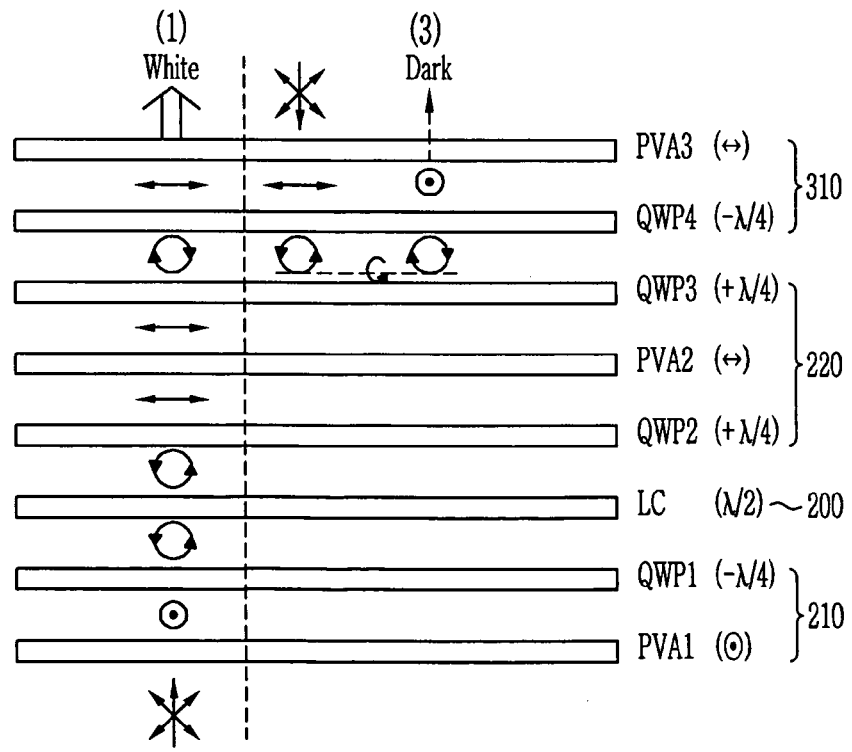

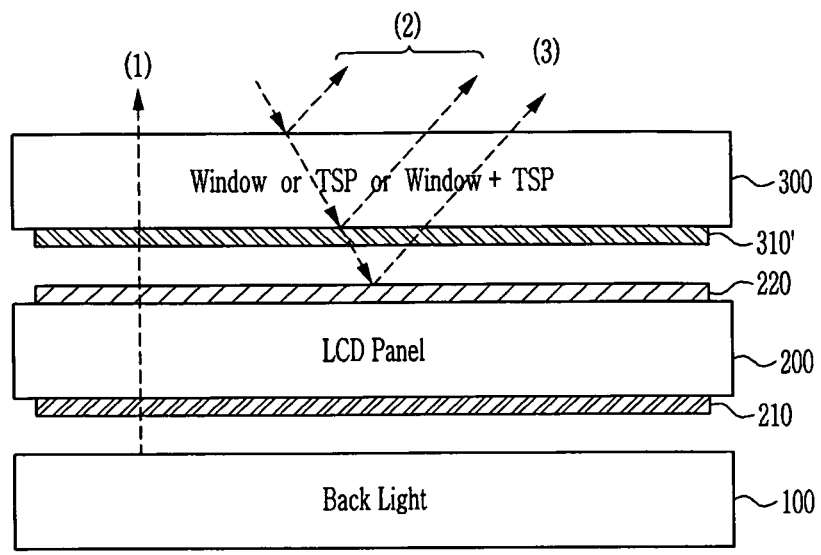
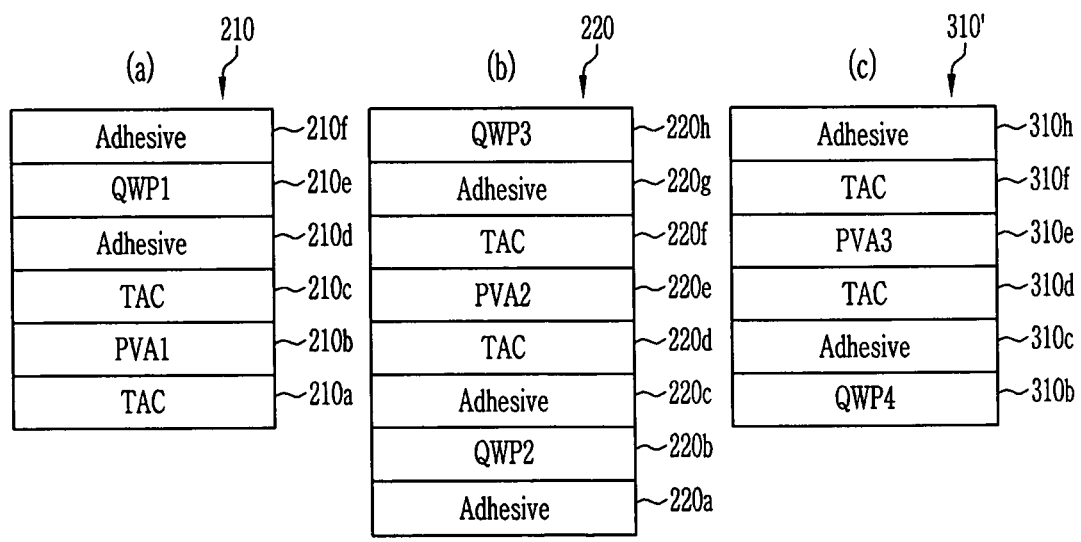

LIQUID CRYSTAL DISPLAY DEVICE

BACKGROUND

1. Field

Embodiments relate to a liquid crystal display device and, more particularly, to a liquid crystal display device having an improved visibility by reducing a reflection of external light.

2. Description of the Related Art

A liquid crystal display (LCD) device allows displays having reduced size, weight, and energy consumption compared to conventional cathode ray tube displays. For this reason, LCD devices have been widely used in mobile equipment, e.g., cellular telephones, PDAs, and the like, as well as in midsize and large equipment, e.g., monitors, TVs, and the like.

A window substrate is generally included in an upper portion of the LCD device, i.e., above, or closer to a viewing surface than, the LCD panel. A touch screen panel may also be provided above the LCD panel, depending on a signal-input method for the equipment. However, when additional structures are provided above the LCD panel, the visibility of image displayed in the LCD panel when used in a bright environment, e.g., daylight, is reduced due to reflection of incident external light by the window substrate and/or the touch screen panel.

SUMMARY

Embodiments are therefore directed to liquid crystal display device, which substantially overcome ones or more of the problems due to the limitations and disadvantages of the related art.

It is therefore a feature of an embodiment to provide a liquid crystal display device having improved visibility.

It is therefore another feature of an embodiment to provide a liquid crystal display device having reduced reflection of external light.

At least one of the above and other features and advantages may be realized by providing a liquid crystal display device, including a liquid crystal display panel, a first polarizer between the liquid crystal display panel and a back light behind the liquid crystal display panel, the first polarizer including a first polarization film having a first transmission axis and a first phase-difference film having a first polarization axis, a second polarizer in front of the liquid crystal display panel, the second polarizer including a second polarization film having a second transmission axis intersecting the first transmission axis, a second phase-difference film having a second polarization axis intersecting the first polarization axis, and a third phase-difference film having a third polarization axis, and a substrate structure in front if the liquid crystal display panel and the second polarizer, the substrate structure including a third polarizer, the third polarizer including a fourth phase-difference film having a fourth polarization axis intersecting the third polarization axis.

The first polarization axis and the second polarization axis may be orthogonal.

The third polarization axis and the fourth polarization axis may be orthogonal.

The second polarization axis and the third polarization axis may be orthogonal or equal.

The first transmission axis and the second transmission axis may be orthogonal.

The third polarizer further may include a third polarization film having a third transmission axis intersecting the first transmission axis. The third transmission axis may be equal to the second transmission axis. The third polarizer may include, in sequential order from the back light, the fourth phase-difference film and the third polarization film.

The first polarizer may include, in sequential order from the back light, the first polarization film and the first phase-difference film.

The second polarizer may include, in sequential order from the back light, the second phase-difference film, the second polarization film, and the third phase-difference film.

The substrate structure may be a window substrate, a touch screen panel, or a window substrate integral with the touch screen panel.

The substrate structure and the liquid crystal display panel may be spaced apart to include an air layer therebetween.

The third polarizer may be at the front or the rear of the substrate structure. The third polarizer may include an anti-pollution coating layer on a front surface.

The substrate structure may include a touch screen panel in front of the liquid crystal display panel. The substrate structure may further include a window substrate in front of the touch screen panel, wherein the third polarizer is between the touch screen panel and the window substrate.

The liquid crystal display device may include a touch screen panel integrated with the liquid crystal display panel, wherein the third polarizer is at the front or the rear of the substrate structure.

The first to the fourth polarization axes may be set within +40° to +50° or −50° to −40° relative to the first or the second transmission axis.

The first polarization axis and the fourth polarization axis may be orthogonal or equal.

BRIEF DESCRIPTION OF THE DRAWINGS

The above and other features and advantages will become more apparent to those of ordinary skill in the art by describing in detail exemplary embodiments with reference to the attached drawings, in which:

FIG. 3 illustrates a cross-sectional view of an internal light transmission principle and an external light reflection reduction principle using polarizers in a liquid crystal display device as depicted in FIG. 1 and FIG. 2;

FIG. 4 illustrates a cross-sectional view of another embodiment of an internal light transmission principle and an external light reflection reduction principle using a polarizer of a liquid crystal display device as depicted in FIG. 1 and FIG. 2;

FIG. 5 illustrates a cross-sectional view of a liquid crystal display device according to a second embodiment;

FIG. 6 illustrates configurations of first to third polarizers for use in FIG. 5 according to embodiments;

DETAILED DESCRIPTION

Figure 1:
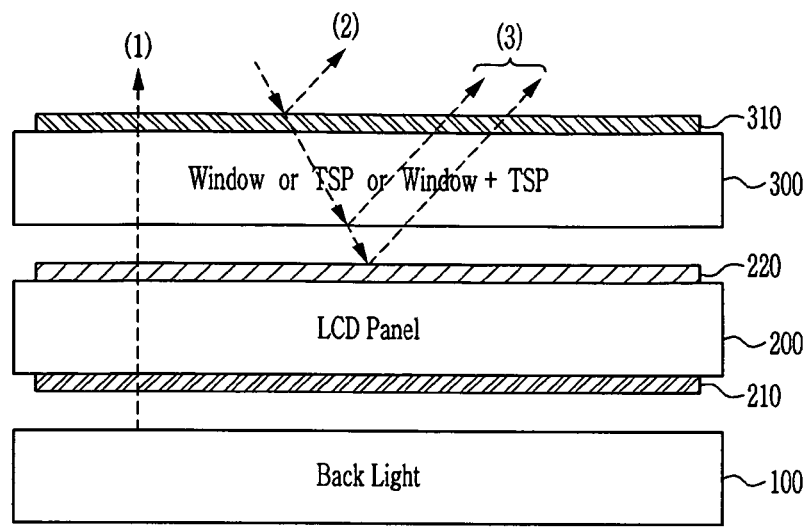
FIG. 1 illustrates a cross-sectional view of a liquid crystal display device according to a first embodiment.

Korean Patent Application No. 10-2010-0037851, filed on Apr. 23, 2010, in the Korean Intellectual Property Office, and entitled: "Liquid Crystal Display" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
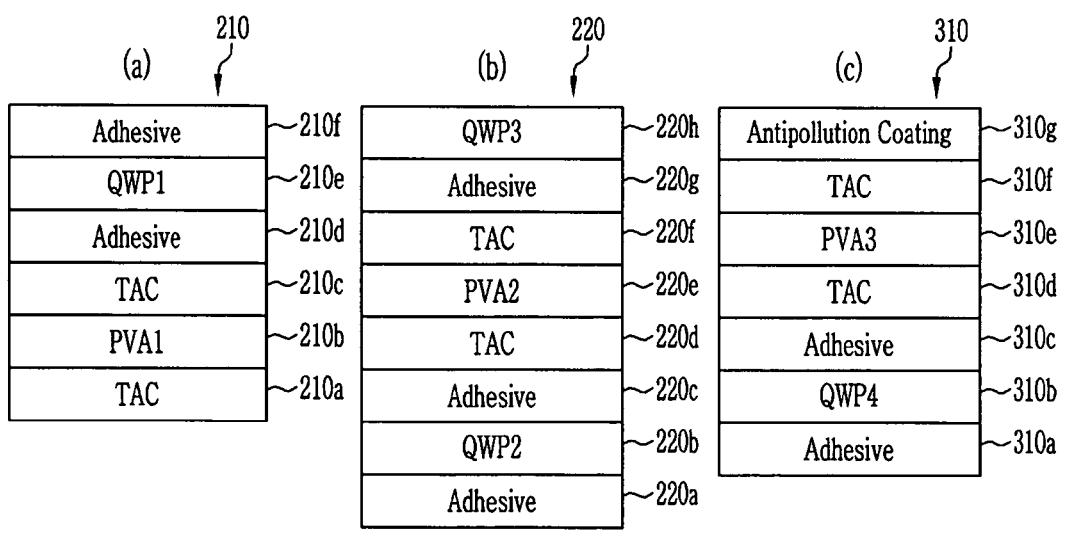
FIG. 2 illustrates configurations of the first to the third polarizer for use in FIG. 1 according to embodiments.

FIG. 1 illustrates a cross-sectional view of a liquid crystal display (LCD) device according to a first embodiment. FIG. 2 illustrates configurations of the first to the third polarizer as depicted in FIG. 1 according to embodiments.

Referring to FIG. 1, the LCD device according to the first embodiment includes a back light 100 for supplying light to the LCD panel 200, the LCD panel 200 for displaying an image, and a substrate structure 300 above the LCD panel 200. The LCD device further includes a first polarizer 210 and a second polarizer 220 included respectively in the rear and the front of the LCD panel 200, and a third polarizer 310 included in the substrate structure 300. As used herein, the relative position terms "rear", "below", "bottom" or "lower" refer to an order in which an element is closer to the back light 100 and "front", "above", "top" or "upper" refer to an order in which an element is closer to a viewing surface of the LCD device.

The LCD panel 200 includes numerous components (not separately shown), including a liquid crystal (LC) layer between upper and lower substrates. The LCD panel 200 displays an image by controlling transmission of light supplied from the back light 100.

Both light transmitting surfaces of the LCD panel 200 include a polarizer. In other words, the rear side (bottom side) of the LCD panel includes the first polarizer 210 and the front side (top side) of the LCD panel includes the second polarizer 220.

The first polarizer 210 and the second polarizer 220 each include a polarization film that absorbs or transmits light selectively according to a polarization direction of incident light. In this case, the transmission axes of the polarization films included in the first polarizer 210 and the second polarizer 220 intersect. For example, the transmission axes of two polarization films may be orthogonal, as will be described in detail later.

In addition, the first polarizer 210 and the second polarizer 220 each further include a quarter-wave plate (QWP), i.e., a phase-difference film, which creates a quarter-wavelength ($\lambda/4$) shift by retarding one polarization state by ±45°.Such a QWP left-circularly polarizes ($-\lambda/4$) or right-circularly polarizes ($+\lambda/4$) linearly polarized light, and linearly polarizes circularly polarized light. A first polarization axis of a first phase-difference film included in the first polarizer 210 intersects a second polarization axis of a second phase-difference film included in the second polarizer 220. More specifically, the polarization axes of two phase-difference films may be orthogonal.

Meanwhile, in embodiments, the second polarizer 220 further includes a third phase-difference film having a polarization axis that intersects a polarization axis of a fourth phase-difference film included in the third polarizer 310. The polarization axes of the second and third phase-difference films included in the second polarizer 220 may be set to be equal or to be orthogonal, while the polarization axes of the third and fourth phase difference films intersect, e.g., are orthogonal.

The substrate structure 300 is above the LCD panel 200. The substrate structure 300 may be one of a window substrate, a touch screen panel, or a integral window substrate/touch screen panel.

An air layer may be between the substrate structure 300 and the LCD panel 200, i.e., the substrate structure 300 may be spaced apart from the LCD panel 200. The substrate structure 300 includes the third polarizer 310. For example, the third polarizer 310 may be included in the front of the substrate structure 300.

FIG. 2 explains in detail configurations of the first to the third polarizer 210, 220, 310 according to embodiments. For example the first polarizer 210 may be configured as depicted in (a) of FIG. 2, the second polarizer 220 may be configured as depicted in (b) of FIG. 2, and the third polarizer 310 may be configured as depicted in (c) of FIG. 2.

Referring to FIG. 2, the first polarizer 210 includes, in order from the back light 100, a first polarization film 210*b* having the first transmission axis and a first phase-difference film 210*e* having a first polarization axis. More specifically, the first polarizer 210 may include the first polarization film 210*b* having supports 210*a*, 210*c* made of, e.g., TAC (triacetyl-cellulose), on both sides of the first polarization film 210*b*, the first phase-difference film 210*e* above the first polarization film 210*b* secured by an adhesive 210*d*, and an adhesive 210*f* above the first phase-difference film 210*e* for attaching the first polarizer 210 to the LCD panel 200.

The first polarization film 210*b* may be made of polyvinyl alcohol (PVA). The first polarization film 210*b* selectively transmits incident light of only a particular polarization. In other words, the first polarization film 210*b* has the first transmission axis and a first absorption axis, orthogonal to the first transmission axis. Thus, light in a direction of the first absorption axis is absorbed, i.e., not transmitted, by the first polarization film 210*b*, while light in a direction of the first transmission axis is transmitted by the first polarization film 210*b*.Therefore, light output from the first polarization film 210*b* is linearly polarized.

The first phase-difference film 210*e* shifts the phase of the linearly polarized light output from the first polarization film 210*b* by ±45°, thereby serving as a first quarter-wave plate (QWP1) to convert the linearly polarized light to left-circularly polarized or right-circularly polarized light. The first phase-difference film 210*e* may be set as ¼ wavelength plate having the first polarization axis set within +40° to +50° or −50° to −40° relative to the first transmission axis of the first polarization film 210*b*.

The second polarizer 220 includes, in sequence from the back light 100, a second phase-difference film 220*b* having the second polarization axis, the second polarization film 220*e* having the second transmission axis, and the third phase-difference film 220*h* having the third polarization axis. More specifically, the second polarizer 220 includes the second polarization film 220*e* including the supports 220*d*, 220*f* made of, e.g., TAC, on both sides, the second phase-difference film 220*b* attached in the bottom portion of the second polarization film 220*e* by the adhesive 220*c*, the third phase-difference film 220*h* attached above the second polarization film 220e by an adhesive 220g, and an adhesive 220a below the second phase-difference film 220b for attaching the second polarizer 220 to the LCD panel 200.

The second polarization film 220e may be made of PVA. The second polarization film 220e selectively transmits incident light of only a particular polarization, and includes the second transmission axis intersecting the first transmission axis of the first polarization film 210b included in the first polarizer 210, and a second absorption axis orthogonal to the second transmission axis. For example, the second transmission axis of the second polarization film 220e may be orthogonal to the first transmission axis of the first polarization film 210b, the second absorption axis of the second polarization film 220e may be set to align with, i.e., be equal to, the first transmission axis of the first polarization film 210b.In other words, the light in the direction of the second absorption axis among the incident light of the second polarization film 220e is absorbed and not transmitted, but the light in the direction of the second transmission axis is transmitted.

The second phase-difference film 220b acts as a second quarter-wave plate (QWP2), and may be set as ¼ wavelength plate having the second polarization axis set within +40° to +50° or −50° to −40° relative to the first transmission axis of the first polarization film 210b or the second transmission axis of the second polarization film 220e.However, the second polarization axis of the second phase-difference film 220b is set to intersect the first polarization axis of the first phase-difference film 210e.For example the first polarization axis and the second polarization axis may be orthogonal, i.e., the first and second polarization films 210b, 220e may be crossed polarizers.

The third phase-difference film 220h acts as a third quarter-wave plate (QWP3) that left-circularly polarizes or right-circularly polarizes linearly polarized light, and may be set as ¼ wavelength plate having the third polarization axis set within +40° to +50° or −50° to −40° relative to the first transmission axis of the first polarization film 210b or the second transmission axis of the second polarization film 220e.The third polarization axis of the third phase-difference film 220h and the second polarization axis of the second phase-difference film 220b may be set to be orthogonal or to be equal.

The third polarizer 310 includes, in order from the back light 100, a fourth phase-difference film 310b having the fourth polarization axis and a third polarization film 310e having the third transmission. More specifically, the third polarizer 310 includes the third polarization film 310e having supports 310d, 310f made of, e.g., TAC, on both sides, the fourth phase-difference film 310b attached to the bottom of the third polarization film 310e by an adhesive 310c, and an adhesive 310a below the fourth phase-difference film 310b for attaching the third polarizer 310 to the substrate structure 300. The third polarizer 310 may further include an antipollution coating layer 310g that is exposed to the outside when the third polarizer 310 is attached to an upper surface of the substrate structure 300.

The third polarization film 310e may be made of PVA. The third polarization film 310e selectively transmits incident light, and includes the third transmission axis intersecting the first transmission axis of the first polarization film 210b included in the first polarizer 210, and a third absorption axis orthogonal to the third transmission axis. For example, the third transmission axis of the third polarization film 310e may be orthogonal to the first transmission axis of the first polarization film 210b and may be equal to the second transmission axis of the second polarization film 220e included in the second polarizer 210.

The fourth phase-difference film 310b acts as a fourth quarter-wave plate (QWP4), and may be set as ¼ wavelength plate having the second polarization axis set within +40° to +50° or −50° to −40° relative to the first transmission axis of the first polarization film 210b or the second transmission axis of the second polarization film 220e.The fourth polarization axis of the fourth phase-difference film 310b may be set to intersect the third polarization axis of the third phase-difference film 220h.For example, the third polarization axis and the fourth polarization axis may be orthogonal.

For the LCD device according to embodiments, the optical properties of the first to the fourth phase-difference films 210e, 220b, 220h, 310b and the first to the third polarization films 210b, 220e, 310e included in the first to the third polarizer 210, 220, 310, may be summarized as follows.

First, the first transmission axis of the first polarization film 210b included in the first polarizer 210 disposed below the LCD panel 200 and the second and the third transmission axis of the second and the third polarization film 220e, 310e included in the second and the third polarizer 220, 310 above the LCD panel 200 intersect to each other. In other words, in order to maximize a transmission rate and minimize a reflection rate, the first transmission axis may be set to be orthogonal to the second and the third transmission axes, and the second and the third transmission axes may be equal.

Second, in order to maximize an optical properties, the first to the fourth polarization axes of the first and the fourth phase-difference films 210e, 220b, 220h, 310b may be set within +40° to +50° or −50° to −40° relative to the transmission axes of the first to the third polarization films 210b, 220e, 310e.

However, the first polarization axis of the first phase-difference film 210e included in the first polarizer 210 and the second polarization axis of the second phase-difference film 220b included in the bottom portion of the second polarizer 220 may intersect, and the third polarization axis of the third phase-difference film 220h included in the upper portion of the second polarizer 220 and the fourth polarization axis of the fourth phase-difference film 310b included in the third polarizer 310 may intersect. In this case, the second and the third polarization axes of the second phase-difference film 220b and the third phase-difference film 220h included together in the second polarizer 220 may be orthogonal or may be equal.

According to embodiments, in addition to the first and the second polarizers 210, 220 included in the rear and the front of the LCD panel 200, respectively, the third polarizer 310 may be further included in the substrate structure 300 that includes an air layer therebetween and is disposed in the upper portion of the LCD panel 200. In addition, the second polarizer 220 includes the second phase-difference film 220b having the second polarization axis intersecting the first polarization axis of the first phase-difference film 210e included in the first polarizer 210, and the third phase-difference film 220h having the third polarization axis intersecting the fourth polarization axis of the fourth phase-difference film 310b included in the third polarizer 310.

In this configuration, while the transmission rate of the internal light emitted through the LCD panel 200 from the back light 100 is sufficiently realized, the reflection of the external light is reduced, so that the visibility of the LCD device can be improved.

A more detailed explanation about an internal light transmission maximization principle and an external light reflection reduction principle using the polarizer of the LCD device according to the embodiment will be described hereinafter with reference to FIG. 3 and FIG. 4.

FIG. 3 illustrates a cross-sectional view of the internal light transmission principle and the external light reflection reduction principle of the LCD device as depicted in FIG. 1 and FIG. 2 according to an embodiment. FIG. 4 illustrates a cross-sectional view of the internal light transmission principle and the external light reflection reduction principle using the polarizer of the LCD device as depicted in FIG. 1 and FIG. 2 according to another embodiment.

FIG. 3 and FIG. 4 depict only components that affect the polarization direction of light, i.e., the polarization films and phase-difference films included in the polarizers and the liquid crystal layer of the LCD device. Other components that do not affect the polarization direction of light are not illustrated for clarity.

For convenience, assuming that the transmission axis of the polarization films (PVA) is set in X-axis or Y-axis direction, and the polarization axis of the phase-difference films (QWP) is left-circularly polarized ($-\lambda/4$, such as $-45°$) relative to the transmission axis of the polarization films (PVA), or right-circularly polarized ($+\lambda/4$, such as $+45°$) relative to the transmission axis of the polarization films (PVA), the changes in polarization as light passes through the LCD device will be described with reference to FIG. 3 and FIG. 4.

However, embodiments are not limited thereto. In other words, the transmission axis of the polarization films (PVAs) is not always set to 0° or 90°, i.e., the X-axis or Y-axis direction, this is just suggested as a standard axis, so the transmission axis of the polarization film (PVA) can be variously modified. In addition, the polarization axis of the phase-difference films (QWP) is not always set to $-45°$ or $+45°$ relative to the transmission axis of the polarization films (PVA). For example, it can be set within $+40°$ to $+50°$ or $-50°$ to $-40°$, experimentally.

In the embodiment illustrated in FIG. 3, the polarization axes of the second and the third phase-difference films (QWP2, QWP3) included in the second polarizer 220 are orthogonal. In FIG. 3, path (1) illustrates a transmission route of the internal light as depicted in FIG. 1; specifically, a transmission route of white light. Path (3) illustrates a reflection route of the external light that enters the substrate structure 300 including the third polarizer 310 and is reflected, as depicted in FIG. 1. Embodiments may improve the visibility by blocking the reflected light (3) that is reflected via the substrate structure 300 including the third polarizer 310. Path (2) in FIG. 1 illustrates a route traversed by reflected light that is not affected by the polarizer in FIG. 1, so is not illustrated in FIGS. 3 and 4.

First, an explanation of the transmission route of the internal light along path (1) with reference to FIG. 3 is provided. Light incident from the back light 100 is polarized in all directions. Light having passed through the first polarization film (PVA1) is linearly polarized. For example, when the transmission axis of the first polarization film (PVA1) is set to Y-axis direction, while the light that is incident from the back light 100 passes through the first polarization film (PVA1), only light along the light transmission axis, e.g., only the component of light along the Y-axis (⊙) direction (+90°), is transmitted.

Linearly polarized light output from the first polarization film (PVA1) is incident on the first phase-difference film (QWP1) and is circularly polarized. For example, when the first polarization axis of the first phase-difference film (QWP1) is set to $+\lambda/4(+45°)$, the linearly polarized light is right-circularly polarized, e.g., 135°.

The right-circularly polarized light from the first phase-difference film (QWP1) is incident on the LC layer of the LCD panel. For example, when the LC layer is set to give the phase-difference of a half-wave $\lambda/2$, right-circularly polarized light having from the first phase-difference film (QWP1) is shifted by ±90° to be left-circularly polarized ($-\lambda/4$), so that the light is now left-circularly polarized to 45° or 225°. In other words, light that was right-circularly polarized will become left-circularly polarized (for convenience, a direction of an arrow in FIG. 3 is illustrated relative to the case of 212), and vice versa.

The left-circularly polarized light from the LC layer is incident on the second phase-difference film (QWP2) and is linearly polarized, now along the X-axis direction (↔). For example, when the second polarization axis of the second phase-difference film (QWP2) is set to $-\lambda/4$ ($-45°$), the left-circularly polarized light from the LC layer passes through the second phase-difference film (QWP2), and is linearly polarized to 0° or 180°.

The linearly polarized light from the second phase-difference film (QWP2) is incident on the second polarization film (PVA2). In this case, when the second transmission axis of the second polarization film (PVA2) is set to X-axis direction (↔), i.e., orthogonal to the first transmission axis of the first polarization film (PVA1), the light of X-axis (↔) direction that is incident on the second polarization film (PVA2) is transmitted and then is incident on the third phase-difference film (QWP3).

While the linearly polarized light passes through the third phase-difference film (QWP3), the light is circularly polarized. For example, when the third polarization axis of the third phase-difference film (QWP3) is set to $+\lambda/4(+45°)$, the light passed through the third phase-difference film (QWP3) is right-circularly polarized to 45° or 225°.

The right-circularly polarized light from the third phase-difference film (QWP3) is incident on the fourth phase-difference film (QWP4) and then is linearly polarized. For example, when the fourth polarization axis of the fourth phase-difference film (QWP4) is set to $-\lambda/4$ ($-45°$), the light passed through the fourth phase-difference film (QWP4) is linearly polarized along the X-axis (↔) direction, i.e., to 0° or 180°.

The linearly polarized light passed through the fourth phase-difference film (QWP4) is incident on the third polarization film (PVA3). In this case, when the third transmission axis of the third polarization film (PVA3) is set to X-axis (↔), i.e., orthogonal to the first transmission axis of the first polarization film (PVA1), the light of X-axis (↔) direction that is incident on the third polarization film (PVA3) is fully transmitted, so that the white image is displayed.

Meanwhile, an explanation of the reflection route of the external light that is passes through the substrate structure 300 including the third polarizer 310 and is reflected is as follows. The light that is incident from the outside includes the light polarized in all directions. The third polarization film (PVA3), only transmits linearly polarized light, i.e., X-axis (↔) direction. The linearly polarized light from the third polarization film (PVA3) is incident on the fourth phase-difference film (QWP4) set to $-45°$, and is left-circularly polarized When the left-circularly polarized light from the forth phase-difference film (QWP4) is reflected by the air layer between the substrate structure 300 and the LCD panel 200 including the second polarizer 220, or their interface, the phase-difference of the light is reversed by 180°, so that the light is the right-circularly polarized light at 135°.

When the right-circularly polarized passed again through the fourth phase-difference film (QWP4), the light is linearly polarized at 90°, i.e., along the Y-axis (⊙) direction. As a result, the linearly polarized light cannot be transmitted by the third polarization film (PVA3), i.e., the linearly polarized light aligns with the absorption axis of the third polarization film (PVA3), so that the visibility is improved by blocking the external reflected light from being viewed.

Meanwhile, FIG. 4 illustrates an embodiment that the polarization axes of the second and the third phase-difference film (QWP2, QWP3) included in the second polarizer 220 are equal. The routes of the light, the polarization direction of the light, and the like are shown in FIG. 4, in which the light is transmitted from the inside, and is reflected from the outside via the third polarizer 310. As the basic principle is same as in FIG. 3, a detailed description of FIG. 4 is not provided.

FIG. 5 illustrates a cross-sectional view of a structure of a LCD device according to a second embodiment. FIG. 6 illustrates configurations of the first to the third polarizers as depicted in FIG. 5 according to embodiments.

The second embodiment as depicted in FIG. 5 and FIG. 6 is different from the first embodiment as depicted in FIG. 1 and FIG. 2, and shows an arrangement example of the third polarizer 310' on the rear of the substrate structure 300. Therefore, when explaining the second embodiment, the part that is same with that in the first embodiment has a same reference numeral, and the detailed description thereof is not repeated.

Referring to FIG. 5 and FIG. 6, the third polarizer 310' is included on the rear of the substrate structure 300. In this case, the third polarizer 310' is not disposed in the uppermost portion of the LCD device, so that the antipollution coating layer 310g on the uppermost portion of the third polarizer 310 according to the first embodiment is removed. Also, the adhesive 310a disposed in the lowest portion of the third polarizer 310 is moved to the upper portion in the third polarizer 310'. In other words, the third polarizer 310' attaches to the rear of the substrate structure 300 by an adhesive 310h included in the upper portion of the third polarizer 310'.

In the second embodiment, the explanation about the elements that affect the polarization direction of the light, i.e., the polarization films, the phase-difference films, and the LC layer of the LCD 200 panel are not provided, as they are similar to those of the first embodiment.

Figure 7:
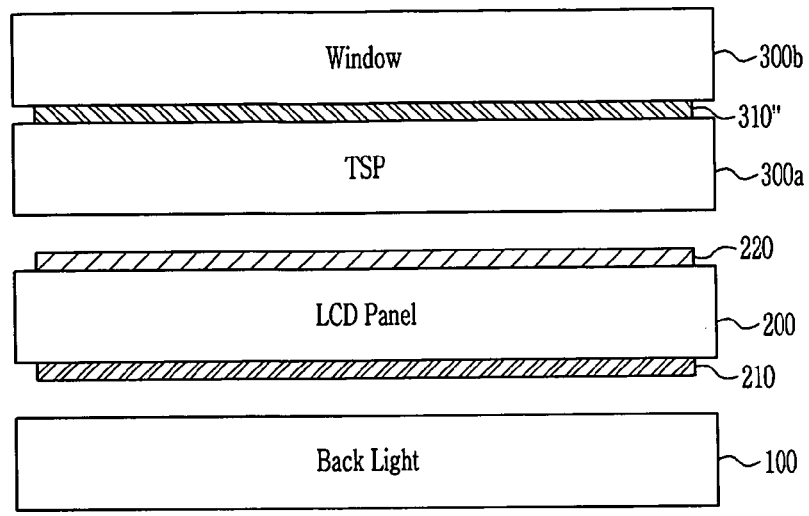
FIG. 7 illustrates a cross-sectional view of a liquid crystal display device according to a third embodiment.
Figure 8:
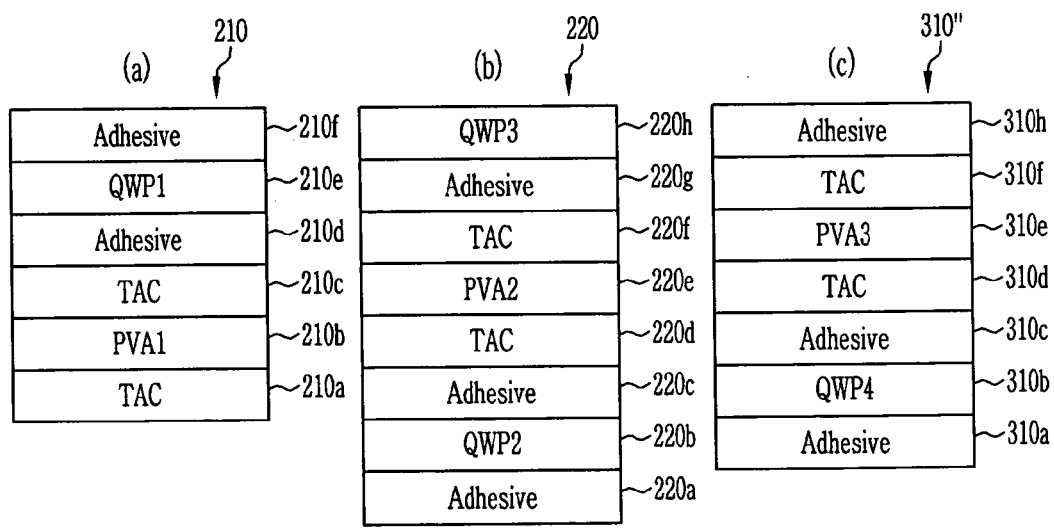
FIG. 8 illustrates configurations of first to third polarizers for use in FIG. 7 according to embodiments.

FIG. 7 illustrates a cross-sectional view of a structure of the LCD device according to a third embodiment. FIG. 8 illustrates configurations of the first to the third polarizers as depicted in FIG. 7 according to embodiments.

In the third embodiment depicted in FIG. 7 and FIG. 8, the substrate structure above the LCD panel 200 includes a touch screen panel 300a to be supplied with touch input and a window substrate 300b above the touch screen panel 300a. A third polarizer 310" may be between the touch screen panel 300a and the window substrate 300b.

In this case, the third polarizer 310" is not disposed in the uppermost portion of the LCD device, so that the antipollution coating layer 310g of the first embodiment is not included, while adhesive layers 310a, 310h are included for bonding the of the third polarizer 310" to the touch screen panel 300a and the window substrate 300b.

For the third embodiment, the configurations and the positions of the polarization films, the phase-difference films, and the LC layer of the LCD panel are basically similar with those of the first and second embodiments, so that the detailed description about those is not repeated.

Figure 9:
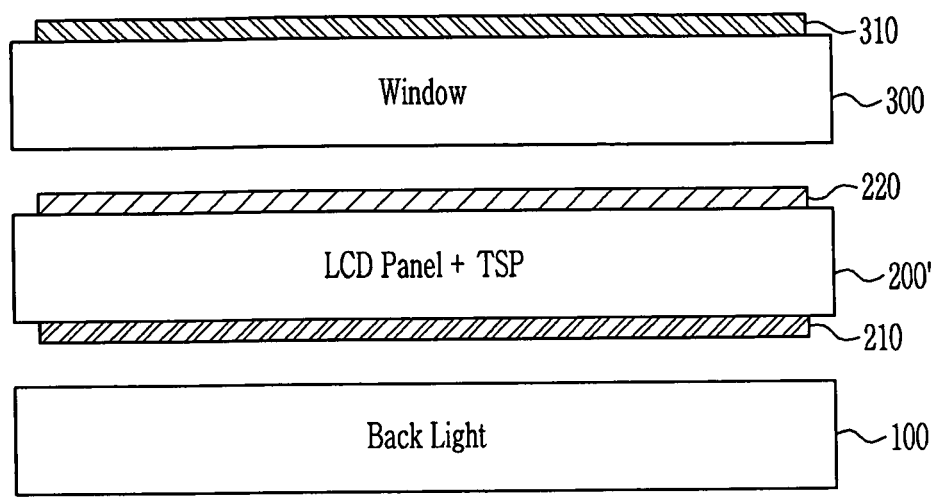
FIG. 9 illustrates a cross-sectional of a liquid crystal display device according to a fourth embodiment.
Figure 10:
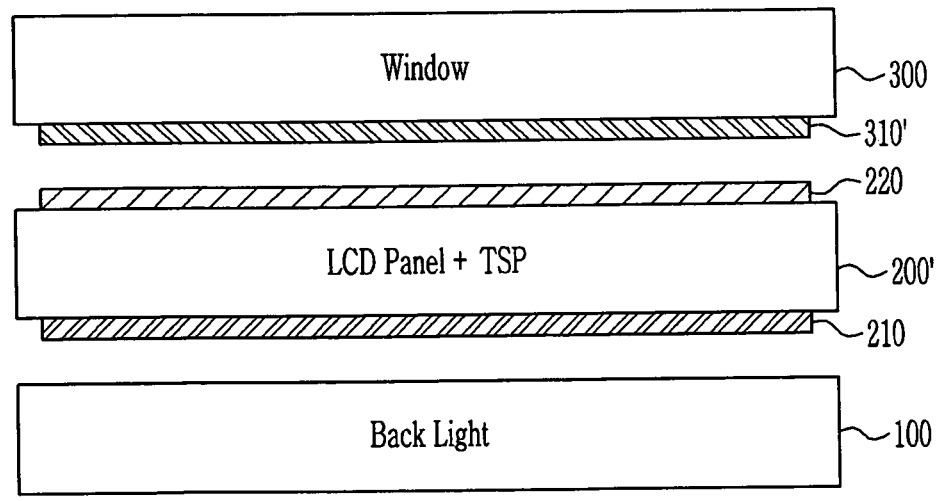
FIG. 10 illustrates a cross-sectional view of a liquid crystal display device according to a fifth embodiment.

FIG. 9 illustrates a cross-sectional view of a structure of a LCD device according to a fourth embodiment. FIG. 10 illustrates a cross-sectional view of a structure of a LCD device according to a fifth embodiment. In FIG. 9 and FIG. 10, an LCD panel 200' includes a touch screen panel integrated with an LCD panel, e.g., by forming pattern for touch sensing in the rear and the front of the upper substrate of the LCD panel, i.e., a color filter substrate.

Referring to FIG. 9 and FIG. 10, the first polarizer 210 is included in the rear of the LCD panel 200' unified with the touch screen panel and the second polarizer 220 is included in the front of the LCD panel 200' unified with the touch screen panel. The first polarizer 210 and the second polarizer 220 may be basically configured similar with the first polarizer 210 and the second polarizer 220 as described in the first to the third embodiments.

The third polarizer 310, 310' may be included in the front of the substrate structure 300 such as the window substrate, as depicted in FIG. 9, or in the rear of the substrate structure 300, as depicted in FIG. 10, respectively. When the third polarizer 310 is included in the front of the substrate structure 300 as depicted in FIG. 9, the third polarizer 310 may be basically configured similar with the third polarizer 310 as described in the first embodiment. When the third polarizer 310' is included in the rear of the substrate structure 300 as depicted in FIG. 10, the third polarizer 310' may be basically configured similar with the third polarizer 310' as described in the second embodiment.

Therefore, according to embodiments, the visibility of the LCD device may be improved by reducing the reflection of the external light while securing sufficient transmission of light from the back light 100 to the outside through the LCD panel 200' including a touch screen panel integrated therewith.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A liquid crystal display device, comprising:
a liquid crystal display panel;
a first polarizer between the liquid crystal display panel and a back light behind the liquid crystal display panel, the first polarizer including a first polarization film having a first transmission axis and a first phase-difference film having a first optical axis;
a second polarizer in front of the liquid crystal display panel, the second polarizer including a second polarization film having a second transmission axis intersecting the first transmission axis, a second phase-difference film having a second optical axis intersecting the first optical axis, and a third phase-difference film having a third optical axis, the second phase-difference film being between the first and third phase-difference films and the second polarization film being between the second phase-difference film and the third phase difference film, and the third optical axis having an angular direction parallel to one of an angular direction of the first optical axis and an angular direction of second optical axis; and
a substrate structure in front of the liquid crystal display panel and the second polarizer, the substrate structure including a third polarizer, the third polarizer including a fourth phase-difference film having a fourth optical axis intersecting the third optical axis.

2. The liquid crystal display device as claimed in claim 1, wherein the first optical axis and the second optical axis are orthogonal.

3. The liquid crystal display device as claimed in claim 2, wherein the third optical axis and the fourth optical axis are orthogonal.

4. The liquid crystal display device as claimed in claim 3, wherein the second optical axis and the third optical axis are orthogonal or equal.

5. The liquid crystal display device as claimed in claim 1, wherein the first transmission axis and the second transmission axis are orthogonal.

6. The liquid crystal display device as claimed in claim 1, wherein the third polarizer further includes a third polarization film having a third transmission axis intersecting the first transmission axis.

7. The liquid crystal display device as claimed in claim 6, wherein the third transmission axis is equal to the second transmission axis.

8. The liquid crystal display device as claimed in claim 6, wherein the third polarizer includes, in sequential order from the back light, the fourth phase-difference film and the third polarization film.

9. The liquid crystal display device as claimed in claim 1, wherein the first polarizer includes, in sequential order from the back light, the first polarization film and the first phase-difference film.

10. The liquid crystal display device as claimed in claim 1, wherein the substrate structure is a window substrate, a touch screen panel, or a window substrate integral with the touch screen panel.

11. The liquid crystal display device as claimed in claim 1, wherein the substrate structure and the liquid crystal display panel are spaced apart to include an air layer therebetween.

12. The liquid crystal display device as claimed in claim 1, wherein the third polarizer is at the front of the substrate structure.

13. The liquid crystal display device as claimed in claim 1, wherein the third polarizer is at the rear of the substrate structure.

14. The liquid crystal display device as claimed in claim 1, wherein the substrate structure includes a touch screen panel in front of the liquid crystal display panel.

15. The liquid crystal display device as claimed in claim 14, wherein the substrate structure includes a window substrate in front of the touch screen panel, wherein the third polarizer is between the touch screen panel and the window substrate.

16. The liquid crystal display device as claimed in claim 1, further comprising a touch screen panel integrated with the liquid crystal display panel, wherein the third polarizer is at the front or the rear of the substrate structure.

17. The liquid crystal display device as claimed in claim 1, wherein the first to the fourth optical axes are set within +40° to +50° or −50° to −40° relative to the first or the second transmission axis.

18. The liquid crystal display device as claimed in claim 1, wherein the first optical axis and the fourth optical axis are orthogonal or equal.

19. The liquid crystal display device as claimed in claim 1, wherein the first to fourth phase difference films are quarter wave plates.

* * * * *